April 12, 1927. Re. 16,589

A. K. SCHAAP, JR

LIQUID LEVEL GAUGE

Original Filed May 4, 1923 2 Sheets-Sheet 1

INVENTOR
ALEXANDER K. SCHAAP JR
BY
Charles H. Wilson
ATTORNEY

April 12, 1927. Re. 16,589

A. K. SCHAAP, JR

LIQUID LEVEL GAUGE

Original Filed May 4, 1923 2 Sheets-Sheet 2

INVENTOR
ALEXANDER K. SCHAAP, JR.
BY Charles H. Wilson
ATTORNEY

Reissued Apr. 12, 1927.

Re. 16,589

UNITED STATES PATENT OFFICE.

ALEXANDER K. SCHAAP, JR., OF BROOKLYN, NEW YORK, ASSIGNOR TO THE SCHAAP-DURANT CONTROL CORPORATION, OF NEW YORK, N. Y., A CORPORATION OF NEW YORK.

LIQUID-LEVEL GAUGE.

Original No. 1,516,829, dated November 25, 1924, Serial No. 636,551, filed May 4, 1923. Application for reissue filed April 9, 1925. Serial No. 21,991.

This invention relates to indicators, and more particularly to an indicating device operating upon the hydrostatic principle for indicating the liquid content in a tank or other receptacle. In the present instance the device is adapted to indicate the quantity of gasoline in the fuel supply tank of an automobile where the vacuum feed principle is employed to withdraw the liquid fuel from the supply tank.

One of the objects of the invention is to provide in an indicator of the above character new and improved means for rectifying and correcting the gauge.

Another object is to provide a device of the above character, wherein the indicating medium in the gauge head will not surge or fluctuate under any conditions of service, but will remain steady, and thereby at all times give an accurate indication.

Another object of the invention is to provide a device of the above character, which will not become clogged by foreign substances in the liquid fuel, and which will not freeze up in the event that water rests in the bottom of the tank.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings, wherein I have illustrated preferred forms of embodiment of my invention:

Figure 1:
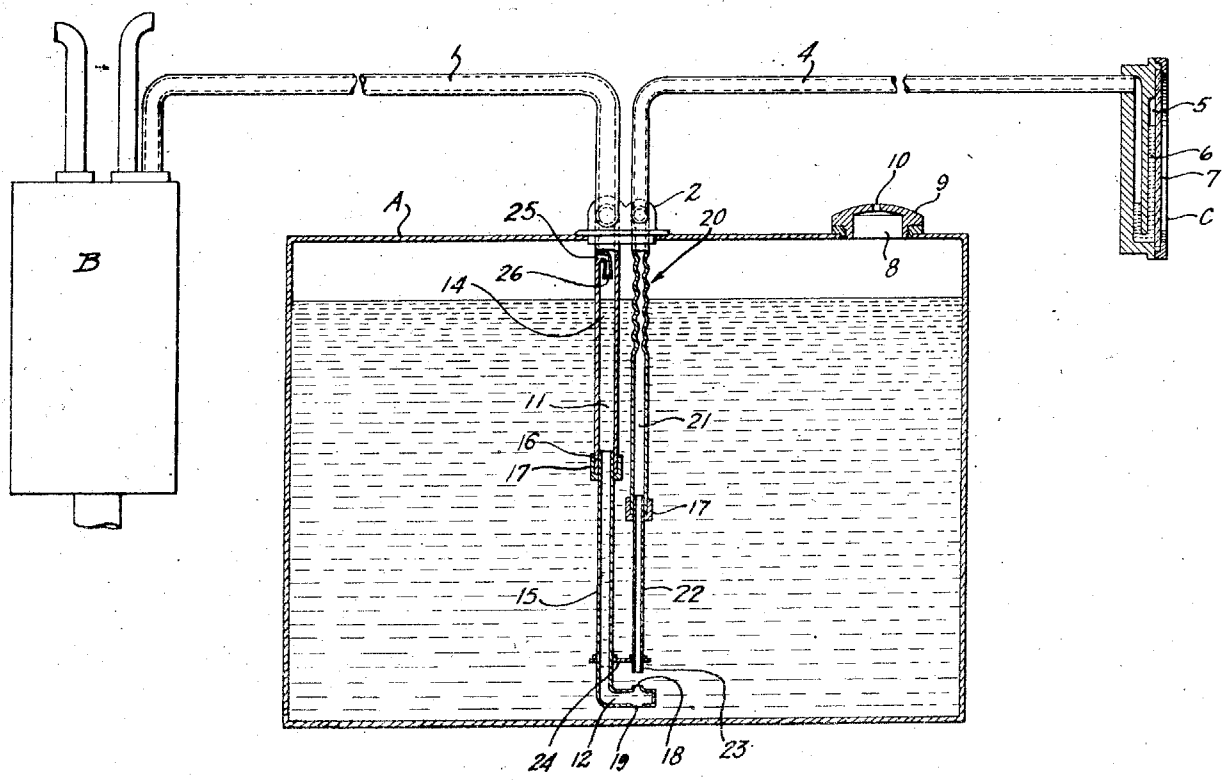
Figure 1 is a schematic view illustrating my invention.

Referring now to the drawings, wherein similar reference characters refer to similar parts throughout the several views thereof, the reference character A denotes a gasoline supply tank, B the usual vacuum tank, and C the gauge. In practice in a gasoline supply system of the vacuum type, the gasoline supply tank A is usually located under the body of the car behind the rear axle; the vacuum tank B at a point under the hood of the automobile above the carburetor, and the gauge C is preferably located on the dash in a position to be observed by the driver of the vehicle.

The function of the vacuum tank B is to draw gasoline through the conduit 1 from the gasoline supply tank, mechanism not shown being employed in the vacuum tank, to trip or operate the valve mechanism when a sufficient quantity of gasoline has been drawn into the vacuum tank, such operation permitting the gasoline remaining in the conduit 1 to return by gravity into the gasoline supply tank.

In the present instance the conduit 1 leads from an elbow 2, having a connection with the top of the gasoline supply tank A, being connected with said elbow as by means of the coupler member 3. Similarly connected with the top of the gasoline tank is a conduit 4, which leads to the gauge C, which as above described, is preferably located upon the dash of the car. The gauge C is provided with a U-shaped tube 5, which contains a quantity of liquid 6, the latter constituting the indicating medium, through its co-operation with a suitable scale, not shown, provided in the front transparent wall 7 of the gauge.

The top of the gasoline tank is provided with the usual aperture 8, through which the gasoline is introduced into the tank, and which is closed by the cap 9 having the usual vent 10, through which air is admitted to the supply tank as the gasoline is drawn therefrom through the conduit 1.

The structure thus far described is old in the art, and constitutes no part of my present invention, which I shall now proceed to describe.

Extending downwardly into the tank from the elbow 2, is a conduit 11, the lower end of which is located as near the bottom wall of the tank as is practicable, said lower end being provided in the present instance with a lateral extension 12 having the closed end 13. The conduit 11 is preferably made in two parts, indicated at 14 and 15, so constructed as to lie in telescoping relation, as at 16, a clamp nut 17 being employed to hold the telescoping parts when once adjusted in fixed relation. The object of arranging the parts of this conduit in telescoping relation is to provide means whereby the device may be adapted in tanks of varying depths.

The lower end 12 of the conduit 11 is provided with an upwardly directed aperture 18, underneath which is provided a registering aperture 19. The conduit 11, of course, is in direct connection with the conduit 1 through the elbow 2.

Extending downwardly into the gasoline supply tank is a second conduit 20, likewise formed of the telescoping sections 21 and 22, the lower end 23 of the conduit 20 being located directly above the aperture 18 in the conduit 11, and slightly spaced therefrom, as clearly shown in the drawings.

The lower ends of the conduits 11 and 20 are preferably held in fixed relation with each other, as by means of the spacing member or bracket 24, which embraces the lower ends of both conduits.

Located in the conduit 11, near the upper end thereof, within the gasoline supply tank, is a vent 25, which vent within the conduit 11, is preferably provided with a downwardly extended open-ended nipple 26. The conduit 20, near its upper end, as shown in Figures 1, 2 and 5, is preferably pinched in opposite directions, as indicated at 27, the object of which construction is to prevent particles of gasoline from being carried by air bubbles upwardly into the conduit 4, and through said conduit into the indicator gauge C.

In the embodiment of my invention shown in Figure 4, the construction is similar to that already described in connection with Figures 1 and 2, except that the lower end 28 of the conduit 20, is enlarged, or given an inverted bell-shaped construction, for a purpose which will be later described.

Figure 2:
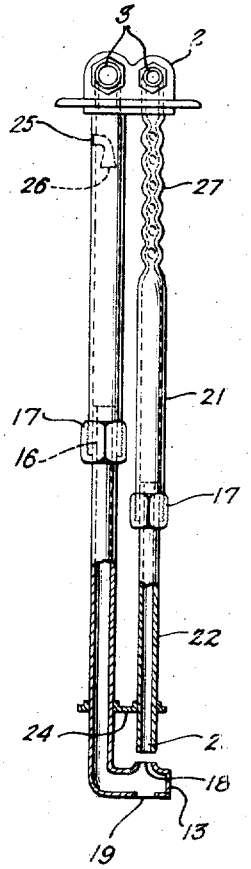
Figure 2 is an elevational view, partly in section, showing the means employed within the gasoline supply tank for rectifying the gauge.

In this embodiment of my invention for the pinched-in construction of this conduit, illustrated in Figures 1 and 2, a ball-chain 29 is suspended in said conduit, sufficient space being provided between the balls forming a part of the chain to permit air to pass upwardly through the conduit 20 into the conduit 4. The lower bell-shaped end 28 is located directly above the aperture 18 of the conduit 11, as in the first described embodiment of my invention.

Figure 5:
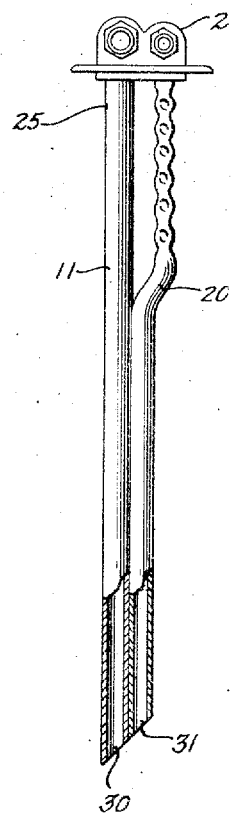
Figure 5 is a similar view, showing still another embodiment of my invention.
Figure 3:
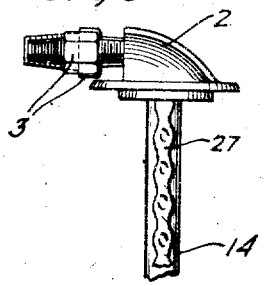
Figure 3 is an elevational view showing a detail of construction.

In the embodiment of the invention shown in Figure 5, the conduits 11 and 20 preferably lie in engagement, as shown, the lower ends of said conduits being cut off at an angle, as indicated at 30 and 31, the lower end of the conduit 20 being disposed above the lower end of the conduit 11, so that air passing downwardly through the conduit 11, and being discharged through its lower end, will find its way into the lower open end of the conduit 20.

Figure 4:
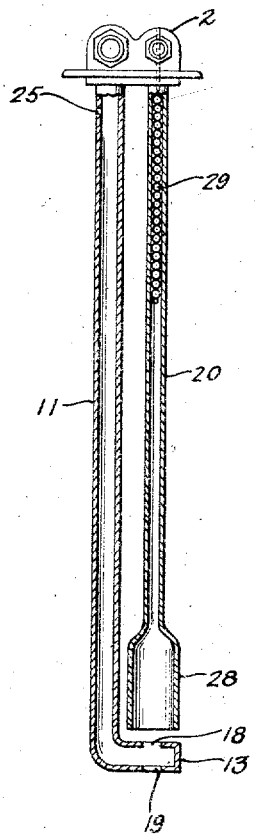
Figure 4 is a view similar to Figure 2, showing another embodiment of my invention.

In the embodiments of my invention shown in Figures 4 and 5, the vent 25 opens directly into the conduits 11, the nipple 26 employed in the first described embodiment being omitted.

Having thus described my invention, the operation thereof, may now be understood.

Referring to Figure 1 of the drawing, and assuming that a quantity of liquid has been provided in the indicator gauge C, it will be observed that a hydrostatic balance is established between the body of the liquid fuel in the supply tank A and the column of liquid in the U-shaped tube of the gauge C; the pressure of the liquid fuel exerted upon the air imprisoned in the conduits 20 and 4 maintaining the said hydrostatic balance, whereby the level of the indicating medium in the U-shaped tube, in conjunction with the scale, will indicate the quantity of liquid fuel in the supply tank. It will be understood, of course, that the relativities of the indicator medium, the scale calibration of the gauge, and the capacity of the gasoline tank, have previously been determined, whereby the gauge will provide an accurate indication for a given sized supply tank.

In the embodiment of my invention shown in Figs. 1 and 2, during the operation of the vacuum tank, liquid fuel will be drawn through the conduits 11 and 1 into the vacuum tank. When a sufficient quantity of liquid fuel has been drawn into the vacuum tank the usual float therein operates to trip, thereby releasing the suction upon conduit 11, and the fuel contained in said conduit is permitted to flow back into the supply tank. This recessional flow of liquid fuel will draw a quantity of air from within the gasoline supply tank, through the vent 25, such air being carried downwardly through the conduit 11, and being discharged from the lower end thereof in minute bubbles through the aperture 18. These bubbles of air will thereupon rise and enter the lower end of the conduit 20.

Thus the tendency of the gauge to fluctuate, due to the varying temperatures in the system is overcome, inasmuch as more than a sufficient quantity of air to make the correction or rectification, is discharged against the open end 23 of the conduit 21 at each recessional flow of the liquid fuel through the suction system.

It is intended that the construction of the vent 25 and the nipple 26, Figure 1, shall be such that no air will be drawn into the liquid fuel feed conduit during the suction operation of the vacuum tank. When, however, liquid fuel flows back by gravity through the feed conduit, air will be drawn into said feed conduit 11 through the nipple 26 and the vent 25, such air being commingled or entrained with the liquid fuel returning to the supply tank. This entrained air will be discharged into the body of liquid fuel in the supply tank and by reason of its buoyancy rise and enter the lower open end of the conduit 20, as has already been described.

In the embodiment of my invention, shown in Figure 4, the purpose of the bell-shaped end of the conduit 20 is to provide for a greater quantity of air being received into said conduit. In this structure where there is no downturned nipple, the air will naturally be drawn in through the port 25 on the suction as well as on the return flow, the velocity of the flow in each instance creating at the mouth of the port 25, sufficient partial vacuum to induce a small quantity of air.

The provision of the aperture 19, immediately beneath the air discharge aperture 18 of the conduit 11, permits the liquid fuel to flow back freely into the supply tank, whereby the liberated air bubbles will immediately rise through said aperture 18, whereupon they will come in contact with the lower open end of the conduit 20.

In the embodiment of my invention shown in Figure 5, it will be noted that the air bubbles entrained in the liquid fuel being discharged through the end 30 of the conduit 11, will rise and tend to enter the end 31 of the conduit 20.

It will accordingly be seen that I have provided a construction well adapted to attain, among others, all the aims and objects above pointed out, in a very simple, yet efficient manner.

It will be further noted that the fluctuating or surging of the indicator medium present in gauges as hitherto constructed and due to the action produced upon the body of the liquid fuel by the suction of the vacuum tank are eliminated due to the fact that in the present instance the opening 19 is provided at the lowermost portion of the suction conduit 11, the said opening 19 being of sufficient diameter to satisfy the suction of the vacuum tank exerted through the conduit 11 without causing said suction to vary the pressure in the conduit 20.

I consider the provision of the baffle construction, such for instance as provided for by the pinched-in construction of the conduit 21, or the inserted baffles 29, illustrated in Figure 4, to be extremely important, inasmuch as they serve to prevent a sudden rush or surge of the liquid fuel upwardly through the conduit 20 in the event that a leak should occur between the upper end of conduit 20 and the connection to the indicating instrument C.

Should the air tight connections of the conduit 4 be suddenly broken, for example, were it not for the inserted baffles which I use, the liquid fuel might surge to a height considerably greater than the actual level of the fuel contents of the tank, and if the tank A were very nearly filled to capacity, the liquid fuel might surge through the fitting 2 into the conduit 4, and form a restriction that would interfere with the accuracy of the gauge.

Also, these inserted baffles serve to facilitate the ejection of gasoline from conduit 20 when installations are made upon cars in which the tank is partly filled with fuel, at the time of such installation.

While I have shown and described my invention as applied to a gasoline supply and feeding system for a motor vehicle, it is obvious, of course, that it may be readily adapted for other analogous purposes.

As many changes could be made in this construction without departing from the scope of the following claims, it is intended that all matter contained in the above description or shown in the accompanying drawing, shall be interpreted as illustrative only and not in a limiting sense.

Having thus described my invention what I claim as new and desire to secure by Letters Patent is:

1. In a device of the class described, in combination, a liquid supply tank, an intermittently operating suction system including a suction device and a conduit extending from a position near the bottom of the supply tank to the suction device, a gauge system including a device for indicating the level of the liquid in the supply tank, and a conduit which extends from a point near the bottom of the supply tank to the gauge, said first and second conduits having their lower ends so arranged that the lower open end of the first named conduit is below the lower open end of said second named conduit, and means for entraining air in the liquid in said first named conduit during the suction flow and the return flow of the liquid.

2. In a device of the class described, in combination, a liquid supply tank, an intermittently operating suction system including a suction device and a conduit extending from a position near the bottom of the supply tank to the suction device, a gauge system including a device for indicating the level of the liquid in the supply tank and a conduit which extends from a point near the bottom of the supply tank to the gauge, said first and second conduits having their lower open ends so arranged that the lower open end of the first named conduit is below the lower open end of said second named conduit, and means for admitting air into said first named conduit when the liquid is falling by gravity into the supply tank, said air being discharged with the liquid through the lower open end of said conduit to be received in the corresponding end of said second named conduit.

3. In a device of the class described, the combination with a liquid supply tank, an intermittently operating vacuum tank and a gauge, of a conduit extending from the vacuum tank through the top wall of the supply tank to a position adjacent the bottom wall thereof, said conduit having an upwardly directed air exit aperture at its lower end, a conduit leading from the gauge through the top wall of the supply tank to a position adjacent the bottom wall thereof and having an air entrance aperture disposed vertically above the air exit aperture of said first named conduit and in spaced relation therewith, and means for admitting air into said first named conduit when the liquid descends therethrough by gravity and discharges into the supply tank.

4. In a device of the class described, the combination with a liquid supply tank, an intermittently operating vacuum tank and a hydrostatic gauge, of a conduit extending from the vacuum tank downwardly into the supply tank and terminating in a lateral extension adjacent the bottom wall of the supply tank, said lateral extension being provided with an upwardly directed air exit aperture, a conduit leading from the gauge to a position near the bottom wall of the supply tank, said conduit having its open end disposed directly above said air exit aperture of said first named conduit and in spaced relation therewith and said first named conduit having an aperture communicating with the air space of the liquid supply tank near the top wall thereof.

5. In a device of the class described, in combination, a liquid supply tank, a suction system having an intermittently operating suction device and a gauge system having a gauge operable by air pressure, the suction system including a conduit extending from the suction device through the upper wall of the supply tank to a position adjacent the bottom wall thereof, the gauge system including a conduit extending through the upper wall of the supply tank to a position adjacent the bottom wall thereof, said first and second named conduits being provided with air exit and air entrance apertures at their lower ends, the air exit aperture of said first named conduit being located below the air entrance aperture of the second-named conduit, means for entraining air in the liquid in said first-named conduit during the suction flow and during the return flow of the liquid through said first named conduit.

6. In a device of the class described, in combination, a liquid supply tank, a suction system having an intermittently operating suction device and a gauge system having a gauge operable by air pressure, the suction system including a conduit extending from the section device through the upper wall of the supply tank to a position adjacent the bottom wall thereof, the gauge system including a conduit extending through the upper wall of the supply tank to a position adjacent the bottom wall thereof, said first and second-named conduits being provided respectively with air exit and air entrance apertures at their lower end, the air exit aperture of said first named conduit being located below the air entrance aperture of the second-named conduit, means for entraining air in the liquid in said first-named conduit during the suction flow of the liquid and its return flow through said first-named conduit and said second-named conduit having means for breaking up air bubbles passing upwardly therethrough.

7. In a device of the class described, a liquid supply tank, a liquid carrying conduit extending into said tank to adjacent the bottom thereof and having means therein above the level of liquid in said tank whereby air is aspirated into the conduit by the flow of liquid through the conduit and then entrained in such flowing liquid, said conduit having its lower end open directly into the body of liquid in the tank and providing a passage for unrestricted flow of liquid and the entrained air into the liquid in the tank, a gauge conduit also open at its lower end to the body of liquid in the tank and having such opening above the entrained air escape passage of the liquid conduit to receive entrained air escaping from the liquid conduit and a pressure gauge connected with said pressure conduit.

8. In a device of the class described, a liquid supply tank, a liquid conduit extending into said tank to a point adjacent the bottom of the same and having an air port in one side thereof above the level of liquid in the tank for automatically entraining air therein by the flow of liquid through the conduit, means for intermittently withdrawing liquid through said conduit and for permitting the return of a portion of the withdrawn liquid back into the tank, whereby in such return flow, air entrained in the liquid conduit will be released from the lower end of the liquid conduit into the tank, a gauge conduit entered in the tank and having an air inlet disposed above the entrained air escape passage of the liquid conduit to receive entrained air released thereby and an indicating gauge connected with said gauge conduit.

9. In a device of the class described, the combination of a liquid containing tank, a liquid carrying conduit entered in said tank, extending to adjacent the bottom thereof and having means whereby air is aspirated into the conduit by the flow of liquid through the conduit and then entrained in such flowing liquid, said conduit being provided at its lower end with an escape passage for liquid and entrained air, a pressure actuated gauge and a pressure conduit extending from said gauge into the tank and provided at its lower end with an open mouthed air receiving bell disposed with its mouth above the air escape passage of the liquid conduit.

10. In a device of the class described, the combination with a liqud containing tank, of liquid and pressure tubes extending into said tank to adjacent the bottom thereof, said liquid tube having an air entrainment port in the side of the same above the level of liquid within the tank and in direct communication with the air space beneath the top of the tank whereby air is aspirated into said tube by the flow of liquid through the tube and then entrained in such flowing liquid, said liquid tube having at the lower end of the same an exit for liquid carrying the entrained air, the pressure tube having an air receiving inlet above said air exit to receive a r entrained in the liquid tube and released with the liquid from the lower end of the same and a pressure gauge in communication with said pressure tube.

11. In a device of the class described, a liquid containing tank, a liquid conduit extending into said tank to a point adjacent the bottom of the same and having an air entrainment opening therein above the liquid level in the tank whereby air is aspirated and entrained in the liquid flowing through said conduit and provided at its lower end with an outlet for discharging into the tank the liquid carrying the entrained air, a suction device connected with said liquid conduit for intermittently withdrawing liquid therethrough, a portion of the withdrawn liquid, when the suction is released, flowing by gravity back into the tank, a pressure conduit entered in the tank to a point adjacent the bottom of the same and having an air inlet disposed above the air outlet of the liquid conduit to thereby receive entrained air released from the liquid conduit during the return flow periods of the suction device and a pressure gauge connected with said pressure conduit.

12. In a device of the class described, a liquid containing tank, a liquid conduit entered in said tank to a point adjacent the bottom thereof and having a restricted air intake in one side of the same above the liquid level of the tank whereby air is aspirated and entrained in the liquid flowing through the conduit, said conduit being provided at its lower end with an outlet for liquid carrying the entrained air, means for creating flow of liquid through the conduit in one direction and permitting return of liquid by gravity in the reverse direction so that upon return flow of liquid through the conduit air entrained therein will be released from the lower end thereof, a pressure conduit having an air inlet disposed above the air outlet of the liquid conduit and a pressure gauge in communication with the pressure conduit.

13. As a new article of manufacture, a cap adapted to be applied to a tank opening and having elbows to receive a liquid line and a pressure line respectively, a conduit dependent from said cap in communication with the liquid line elbow, said conduit having an air intake port in the upper portion of the same and a discharge for entrained air at its lower end, a pressure conduit dependent from said cap in communication with the pressure elbow and provided at its lower end with an air receiving inlet above the entrained air discharge of the liquid conduit.

14. As a new article of manufacture, a cap adapted to be applied to a tank opening and having elbows to receive a liquid line and a pressure line respectively, a conduit dependent from said cap in communication with the liquid line elbow, said conduit having an air intake port in the upper portion of the same and a discharge for liquid and entrained air at its lower end, a pressure conduit dependent from said cap in communication with the pressure elbow and provided at its lower end with an air receiving inlet above the entrained air discharge of the liquid conduit and means forming upwardly convergent constrictions in the pressure conduit above the air inlet therein.

15. As a new article of manufacture, a cap for application to a tank opening, said cap being provided with elbows on the upper face of the same for connection with liquid and pressure lines respectively, liquid and pressure conduits dependent from the cap and in communication with the liquid and pressure elbows respectively, the liquid conduit having means for entraining air therein by flow of liquid therethrough and having an air discharge positioned relative to the pressure conduit so that entrained air discharged from the liquid conduit enters the pressure conduit, there being upwardly convergent restrictions in the pressure conduit above the lower end of the same.

16. In a device of the class described, a liquid containing tank, liquid carrying and pressure conduits entered in said tank and extending to near the bottom thereof, said liquid carrying conduit having means whereby air is aspirated into the conduit by the flow of liquid through the conduit and then entrained in such flowing liquid, an intermittently operating suction device connected with the liquid conduit, a pressure gauge in communication with the pressure conduit, the pressure conduit being open at its lower end to the pressure of liquid within the tank and provided above such opening with upwardly convergent restrictions for breaking up air bubbles and preventing a rush of liquid upwardly through said conduit, the liquid conduit having an outlet for entrained air and the lower end of the pressure conduit being positioned to receive into it the entrained air thus discharged from the liquid conduit.

17. In combination, a liquid containing tank, liquid and pressure conduits extending separately into the tank, the liquid conduit having an air entrainment port in the side of the same above the level of liquid within the tank whereby air is aspirated and entrained in the liquid flowing through the conduit, said conduit having its lower end projecting laterally into position beneath the lower end of the pressure conduit and provided at such point with an upwardly directed air discharge port for directing entrained air into the pressure conduit, the lateral projection of said liquid conduit having a liquid inlet in addition to said air discharge port opening downwardly to the bottom of the tank and a pressure gauge connected with the pressure conduit.

18. In a device of the class described, a liquid containing tank, liquid carrying and pressure conduits entered in said tank and extending to near the bottom thereof, the liquid conduit having means therein whereby air is aspirated into said conduit by the flow of liquid through the conduit and then entrained in such flowing liquid, a pressure gauge connected with said pressure conduit, the liquid conduit having an outlet for liquid carrying entrained air and the pressure conduit having an inlet positioned to receive entrained air discharged from the liquid conduit and curvilinear confining walls forming restrictions in said pressure conduit for successively restricting flow of liquid upwardly through the pressure conduit to prevent liquid reaching remote portions of the pressure conduit.

19. As a new article of manufacture, a cap adapted for application to a tank opening and having tubular extensions on top of the same for connection with a liquid line and a pressure line respectively, a liquid withdrawal conduit dependent from the cap and connected with the liquid line extension on top of the cap, said conduit having means therein opening near the upper end of the conduit in position to take in air beneath the cap and said conduit having an opening at its lower end to discharge liquid with entrained air, a pressure conduit dependent from the cap and connected with the pressure line extension, said pressure conduit being provided at its lower end with an air receiving bell open to and disposed above the entrained air discharge opening of the liquid carrying conduit.

In testimony whereof, I affix my signature.

ALEXANDER K. SCHAAP, Jr.